H. M. LAMBERT.
APPARATUS FOR USE IN MAKING CUSHION TIRES.
APPLICATION FILED AUG. 22, 1921.

1,399,128.

Patented Dec. 6, 1921.

INVENTOR
H. M. Lambert
BY
ATTORNEYS

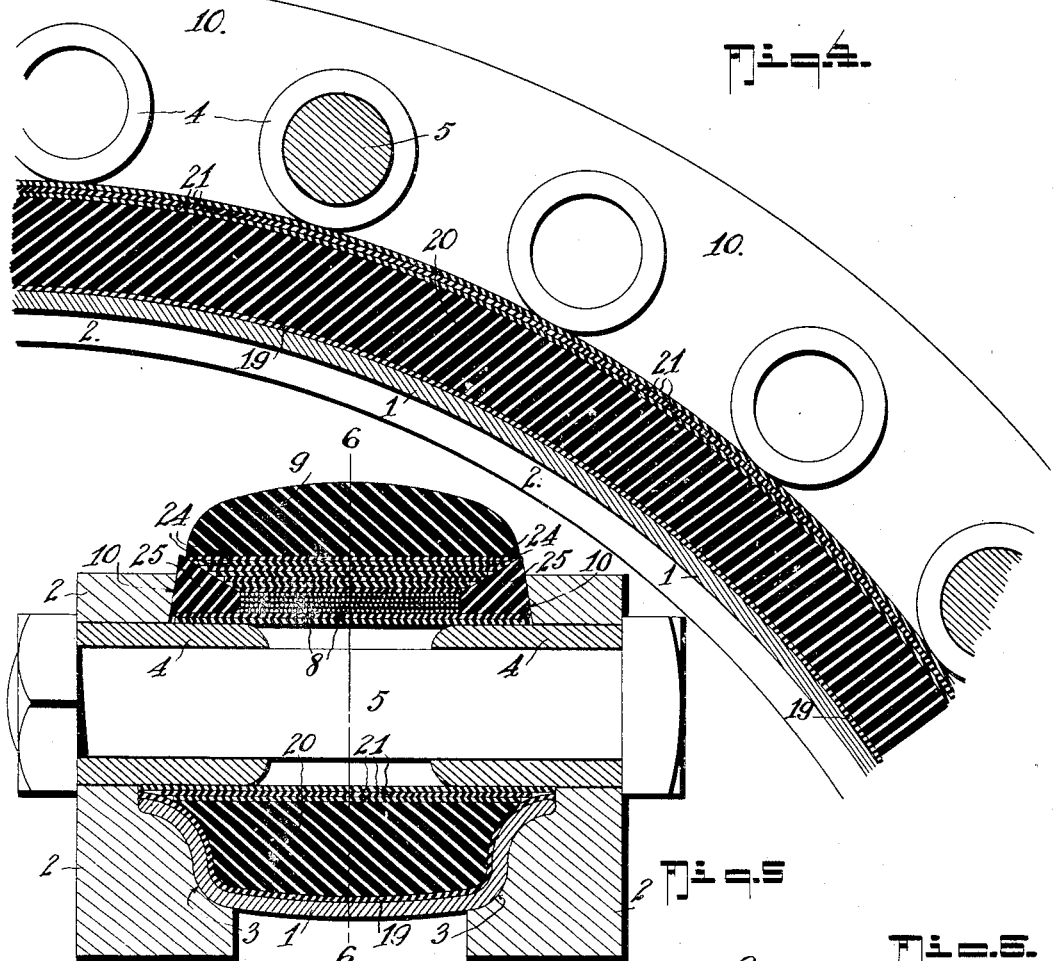
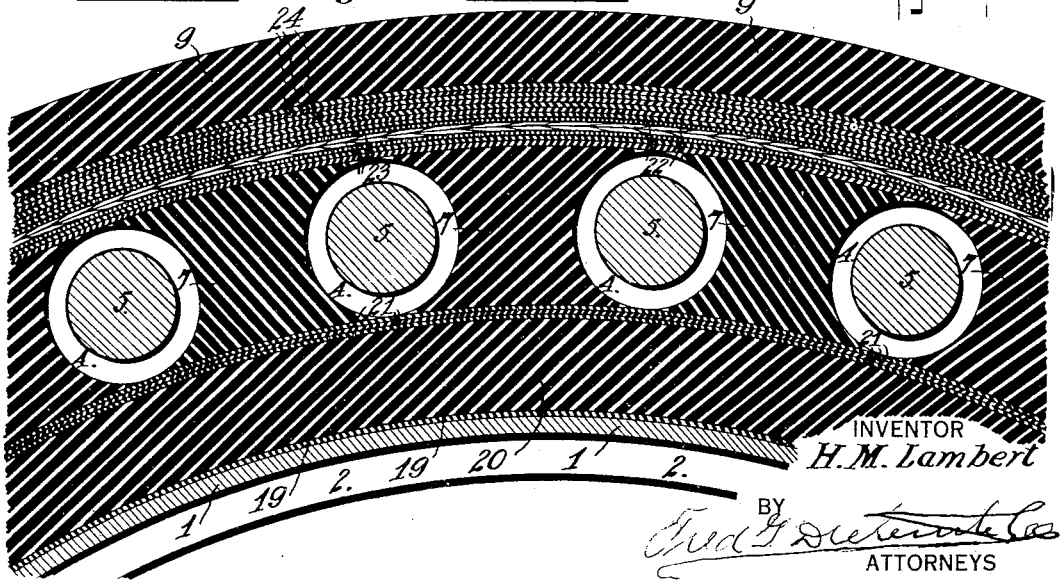

H. M. LAMBERT.
APPARATUS FOR USE IN MAKING CUSHION TIRES.
APPLICATION FILED AUG. 22, 1921.
1,399,128.
Patented Dec. 6, 1921.
3 SHEETS—SHEET 3.
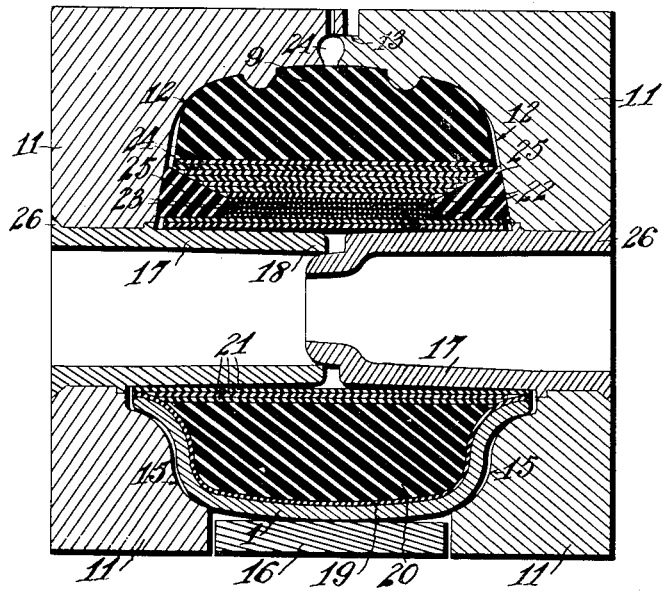
Fig. 7.
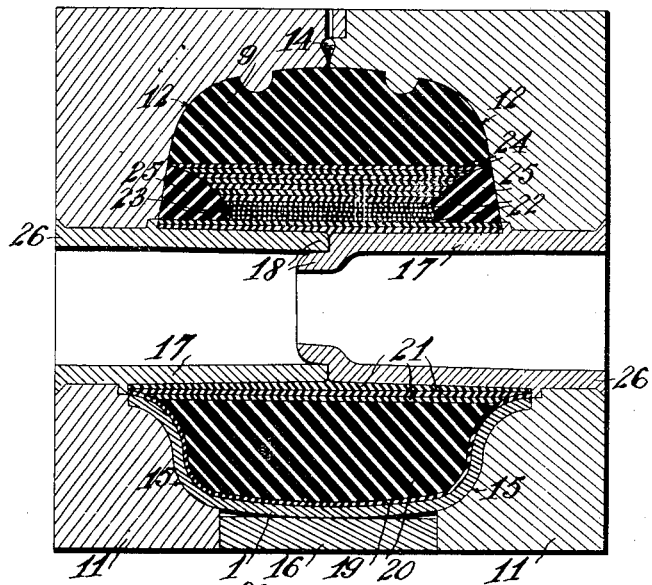
Fig. 8.
Fig. 9.
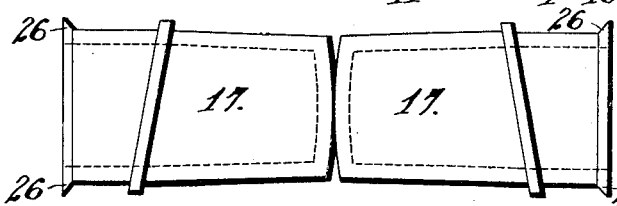
INVENTOR
H. M. Lambert.
BY
ATTORNEYS

UNITED STATES PATENT OFFICE.

HENRY M. LAMBERT, OF PORTLAND, OREGON.

APPARATUS FOR USE IN MAKING CUSHION-TIRES.

1,399,128.  Specification of Letters Patent.  Patented Dec. 6, 1921.

Application filed August 22, 1921. Serial No. 494,257.

*To all whom it may concern:*

Be it known that I, HENRY M. LAMBERT, a citizen of the United States, residing at Portland, in the county of Multnomah and State of Oregon, have invented a new and Improved Apparatus for Use in Making Cushion-Tires, of which the following is a specification.

My invention is a new apparatus for use in manufacturing cushion tires of that type employing endless belts with interposed cushioning blocks or slabs designed to leave holes through or into the tire carcass.

The invention has for an object to provide an apparatus for the employment of which the building up tire carcass and its final curing may be effected in a practical and economical way to produce a tire of long life and good resiliency.

In the drawings:

Fig. 4 is a detail vertical section on the line 4—4 on Fig. 3.

Fig. 5 is a view similar to Fig. 3 showing the carcass completely built up.

Fig. 6 is a detail vertical section similar to Fig. 4 and taken on the line 6—6 of Fig. 5.

Fig. 7 is a cross section of the vulcanizing mold with the tire carcass of Fig. 5 placed therein before closing the mold.

Fig. 8 is a similar view with the mold closed and showing how the lugs tend to expand the material radially at the holes, while the side plates compact the mass laterally.

Fig. 9 is a detail view of the modified construction of lugs or pins used on the vulcanizing molds.

In the drawings in which like numerals and letters of reference designate like parts in all of the figures, 1 designates the rim on which the tire is to be built; the inner surface of the rim being plated with a metal having an affinity for rubber, such as brass for example.

Figure 1:
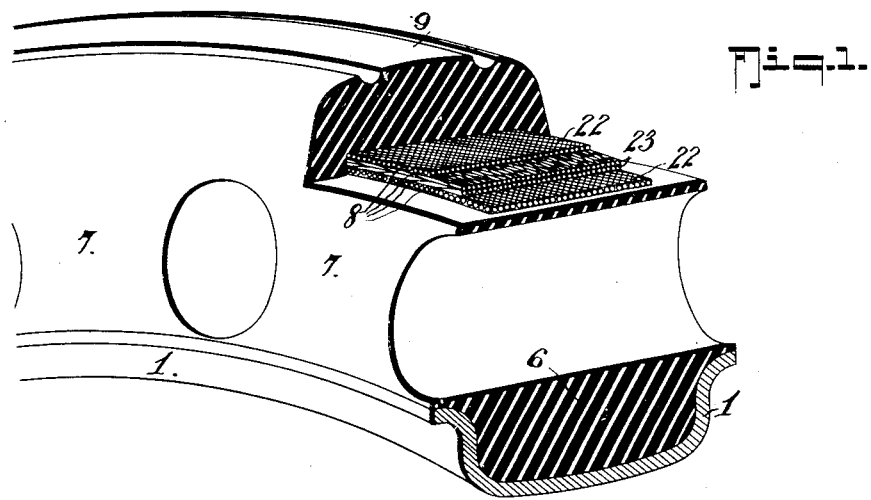
Figure 1 is a perspective view of a portion of a completed tire embodying the invention, parts being cut away to show the structure.
Figure 2:
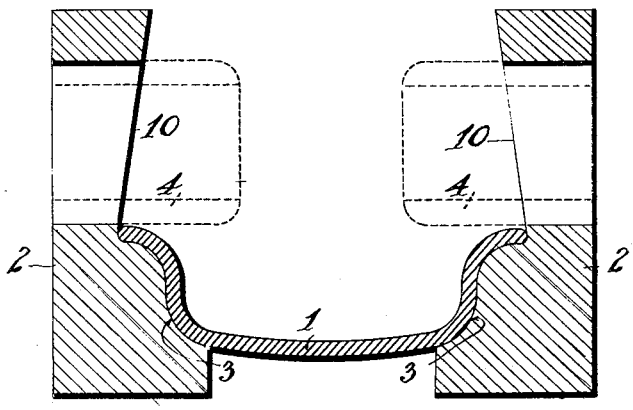
Fig. 2 is a cross section of a form, with rim in place, on which the tire carcass is to be built up.
Figure 3:
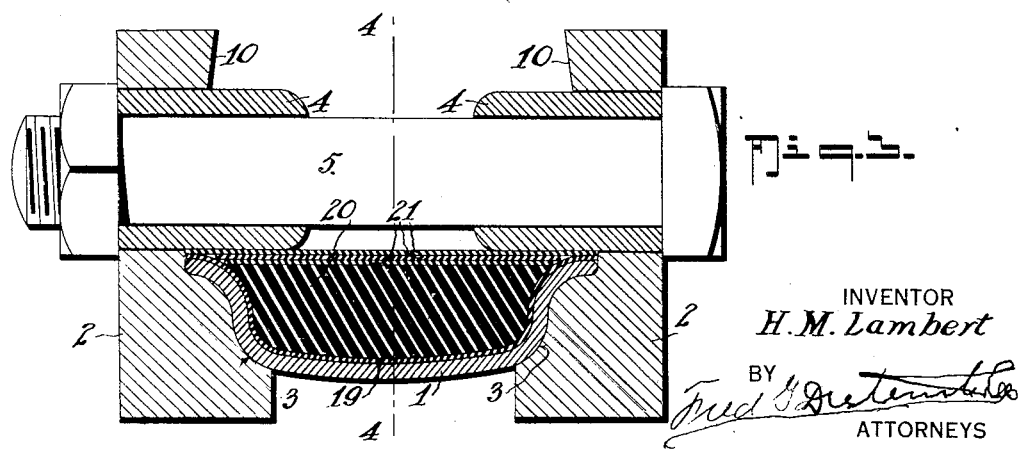
Fig. 3 is a view similar to Fig. 2, the base layer and belt being shown in place ready to receive the cushioning blocks.

In carrying out my method, I provide a pair of side plates 2—2 having portions 3 to receive the rim 1 and provided with short lugs 4, preferably tubular, to permit passage of bolts 5 which hold the side plates 2—2 in proper position and against lateral separation from the rim.

The lugs 4 do not project across the entire width of the rim but only a distance sufficient to act as spacers for the cushion blocks of the tire, later referred to.

After the rim 1 has been placed between the plates 2—2 and the plates positioned properly, with the lugs 4 of one plate opposing those of the other plate, the base structure 6 of the tire is built onto the rim, after which a series of blocks 7 of the shape indicated in Fig. 6 are placed on the base layer and held spaced apart by the series of lugs 4.

The blocks 7 are of cushion gum and after having been placed in position, the outer belt structure 8 and tread part 9 of the tire is built up until a structure such as indicated in Figs. 5 and 6 is produced.

The side plates 2 are arranged with their opposing faces 10 spaced a greater distance apart than the desired final width of the tire, the purpose of which will presently appear.

In building the tire on the rim 1, the belt structure 8 is wound snugly over the blocks 7.

The base structure 6 is preferably made up of a layer of rubber sheet 19 placed in contact with the plated face of the rim 1, a filler 20 of a poorer grade of rubber is then placed in the rim and on top of that one or more layers or bands of rubber 21 are placed to complete the base structure.

The belt structure 8 is preferably composed of layers of rubberized woven fabric and rubberized cord fabric 22—23, respectively, of a width less than that of the finished tire, and over the belt structure is placed one or more rubber strips or bands 24 followed by the tread rubber 9, wedge rings 25 of tough rubber being placed at each side of the belt structure before the bands 24 are applied.

After the tire has been built up between the plates 2—2, the plates are removed from the tire in any desired way and the tire is then placed in the vulcanizing mold, as shown in Figs. 7 and 8.

The vulcanizing mold comprises side plates 11—11 which have their opposing faces 12 shaped to give the tire the final side and tread outline or form desired.

The side plates 11 of the mold are lapped joined where their medial edges meet, as at 13, and are preferably provided with the usual overflow grooves 14 into which excess rubber flows during the squeezing process.

The said plates are also formed at 15 to receive the rim 1 and are provided with a spacing ring 16.

17—17 designate opposing series of pins or lugs carried by the side plates 11 of the vulcanizing mold and these pins 17 are preferably tapered toward their ends so as to facilitate their entry or penetration in the holes of the tire, when the mold is placed on the tire carcass, that are formed between the plates 2—2.

The pins 17 also preferably have a male and female connection at 18, as best shown in Fig. 8, though those of one side plate may simply abut those of the other side plate, as desired, as illustrated in the detail view, Fig. 9.

It will also be noted by reference to Fig. 8 that when the mold is closed, the final dimensions of the mold chamber will be less in width than the space between the plates 2—2 so that a lateral squeeze is imparted to the tire carcass as the mold closes and the pins 17 are preferably of a slightly greater diameter adjacent to the plates 11 than the diameter of the pins 4, so that, in forcing the mold sections 11—11 to the closed position, the pins 17 will have a tendency to expand the openings in the tire carcass and thus exert radial pressure in the openings at the same time the lateral compacting pressure of the mold plates 11—11 is being applied.

This has a tendency to not only compact the tire so as to apply a radial and transverse force to the belts 8, but also aids in holding the belts 8 in a taut condition, after the vulcanization is finished and the mold removed.

The mold members 11—11 may be squeezed together by placing them in a suitable press or they may be brought together in any well known way and held there.

When the mold is closed, the tire and mold are placed in a vulcanizing kettle and vulcanized in the usual way.

It is to be noted that the pins 17 are permanently fastened into the side plates 7 by riveting over the ends of the pins as indicated at 26, so that, when the plates 11 are pulled off from the tire carcass laterally, the pins 17 will be withdrawn also.

In this application I make no claim to the method involved as that forms the subject matter of my original application, filed May 4, 1921, Serial No. 466,812.

From the foregoing description taken in connection with the accompanying drawings, it is thought that the construction and use of the apparatus forming the subject matter of this application will be clear to those skilled in the art.

What I claim is:

1. In apparatus for use in manufacturing cushion tires, a pair of side plates having rim receiving portions and opposing surfaces, short pins or lugs carried by each of said side plates and adapted to project into the area of the tire carcass those lugs on one side being opposite to those on the other side and spaced apart from the same, substantially as shown and for the purposes described.

2. In apparatus of the class described, a vulcanizing mold comprising side plates having opposing surfaces adapted to give form to the finished tire and having recesses to receive the tire rim on which the tire carcass is contained, and opposing sets of tapering lugs secured to said side plates.

3. In apparatus of the class described, a vulcanizing mold comprising side plates having opposing surfaces adapted to give form to the finished tire and having recesses to receive the tire rim on which the tire carcass is contained, opposing sets of tapering lugs secured to said side plates, the opposing sets of said lugs having male and female engagement.

4. In apparatus of the class described, a vulcanizing mold comprising side plates having opposing surfaces adapted to give form to the finished tire and having recesses to receive the tire rim on which the tire carcass is contained, opposing sets of tapering lugs secured to said side plates, said lugs having passageways entirely through the same to provide uninterrupted channels through the mold from side to side.

5. In apparatus of the class described, a vulcanizing mold comprising side plates each having one-half of a cavity in the opposing sides of the plates adapted to give form to the finished tire and having recesses to receive the tire rim on which the tire carcass is contained, opposing sets of tapering lugs secured to said side plates and removable from the tire carcass with the side plates, a spacing rim between the side plates beneath the rim recesses, said lugs having passageways into the same from the outer side of the mold plates substantially as shown and described.

6. In apparatus for use in manufacturing cushion tires, a pair of side plates having rim receiving portions and opposing surfaces, short pins or lugs carried by each of said side plates and adapted to project into the area of the tire carcass, and bolts passing through said lugs for securing the plates and lugs in position

HENRY M. LAMBERT.